March 24, 1925.
H. W. PARTLOW
THERMOSTATIC GOVERNOR
Filed Oct. 29, 1924
1,530,850
2 Sheets-Sheet 1
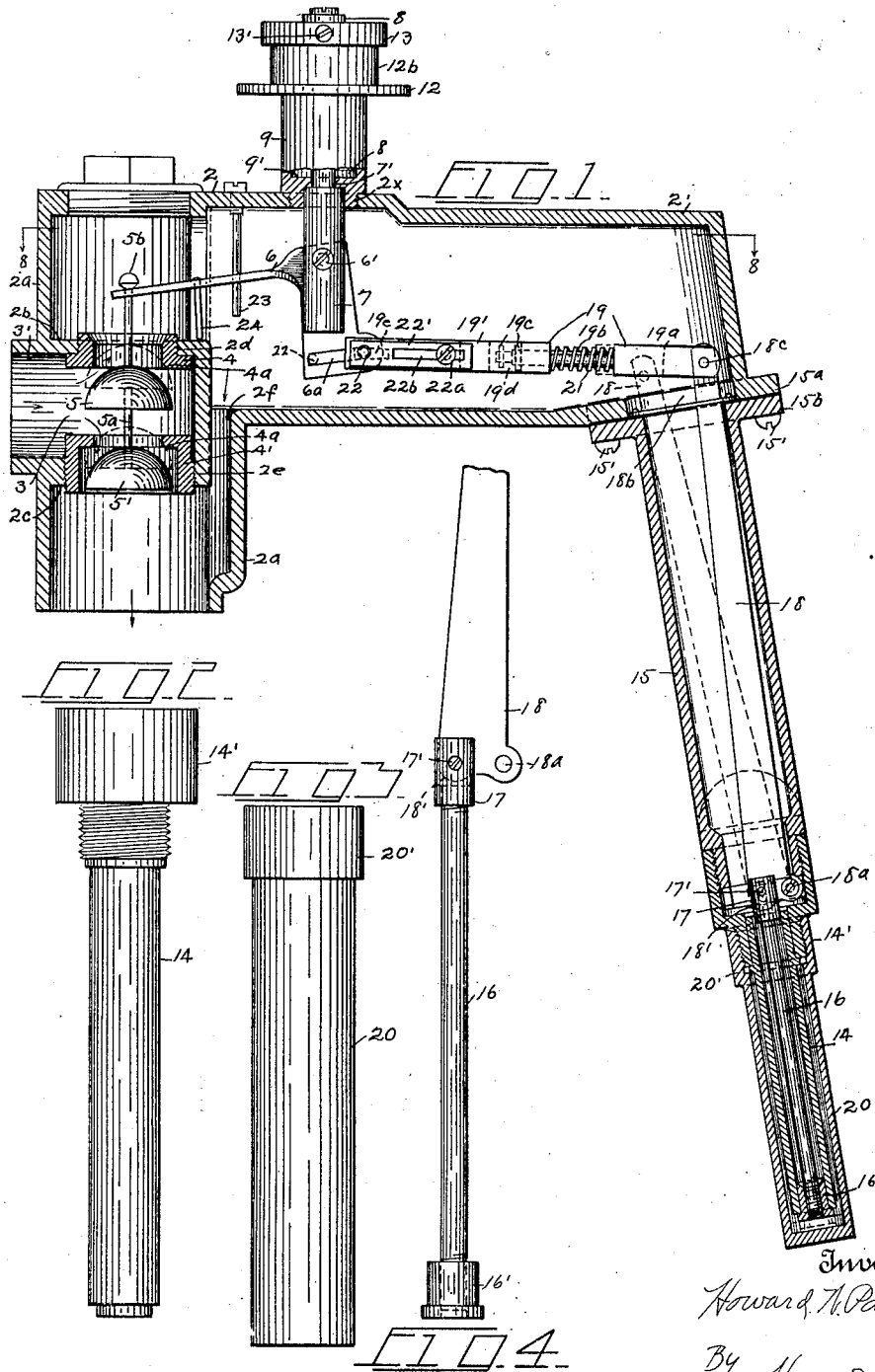

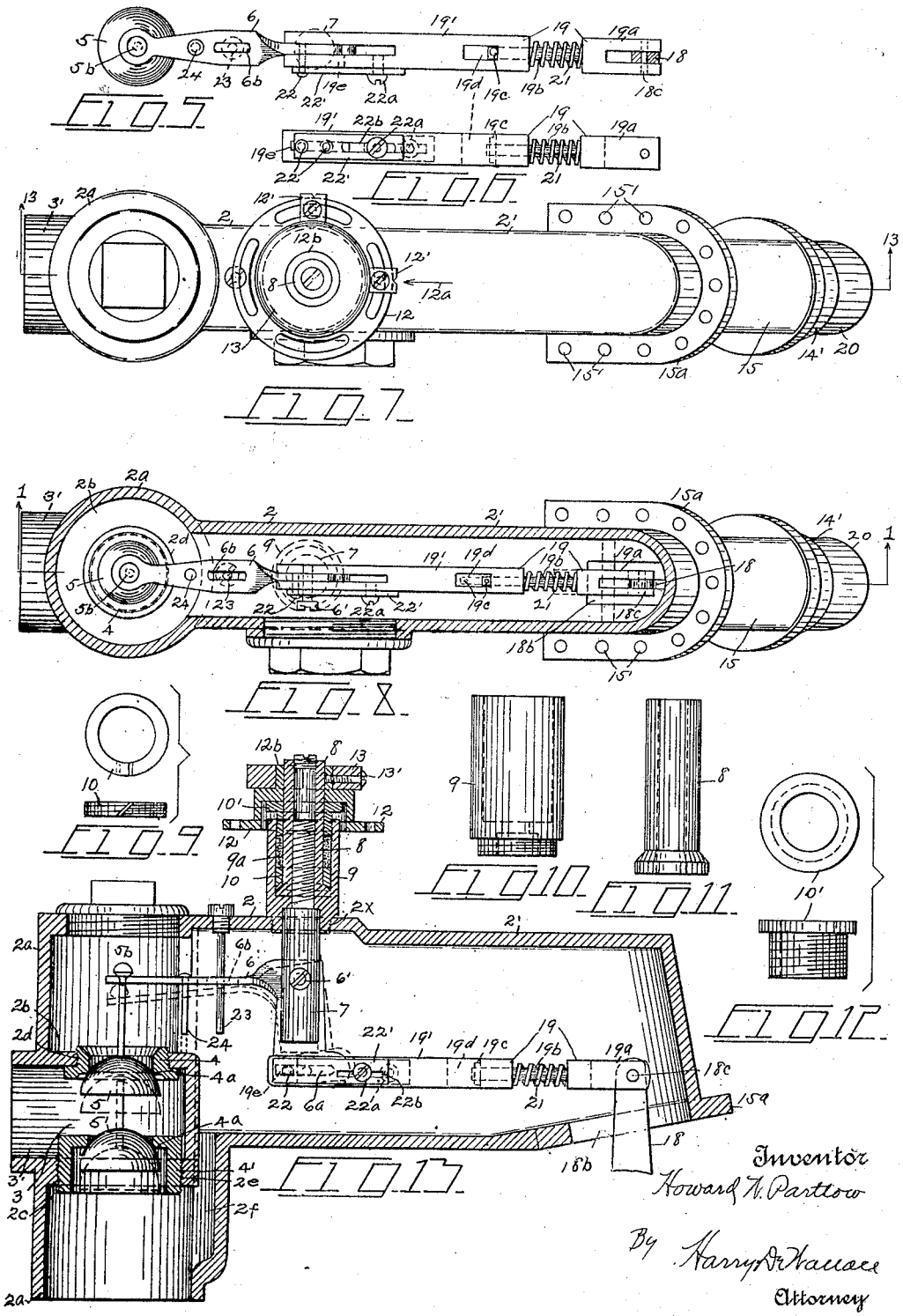

Patented Mar. 24, 1925.

1,530,850

UNITED STATES PATENT OFFICE.

HOWARD W. PARTLOW, OF UTICA, NEW YORK.

THERMOSTATIC GOVERNOR.

Application filed October 29, 1924. Serial No. 746,611.

*To all whom it may concern:*

Be it known that I, HOWARD W. PARTLOW, a citizen of the United States, residing at Utica, in the county of Oneida and State of New York, have invented certain new and useful Improvements in Thermostatic Governors, of which the following is a specification.

This invention relates to improvements in thermostatic governors, designed particularly for controlling the burners of melting pots and the like, wherein the fuel gas is supplied at relatively high pressures.

The object of the invention is to provide an extremely sensitive thermostat for operating the fuel governor, whereby the slightest changes in the temperature of the contents of the melting pot, instantly effect the opening and closing of the governing valves. A further object is to provide novel means for preventing false indications of the temperature of the melting pots, due to variations in the level of the heated medium, in which the thermostat is disposed, relatively to the extent the said element may be submerged. A further object is to provide novel means for adjusting certain of the operating parts which connect the thermostat with the governing valves. A further object is to provide cushion means for preventing breaking or undue straining of certain of the operating parts, when the expansion and contraction of the thermostat exceeds a predetermined range or continues after the valves are closed. And a further object is to provide novel means for adjusting the primary valve-operating mechanism for pre-determining temperatures within a relatively broad range.

I attain these objects by the means set forth in the detailed description which follows, and as illustrated by the accompanying drawings, in which—

Figure 1 is a central vertical section, taken on line 1—1 of Fig. 8; showing the balanced valves opened. Fig. 2 is a detached view of the thermostatic element. Fig. 3 is a similar view of the housing which encloses the said element. Fig. 4 is a detached view of the neutral rod which is enclosed by the thermostatic tube, and a portion of the rocking lever actuated by said rod. Fig. 5 is a top plan view of the extensible link which connects the rocking lever with the valve lever. Fig. 6 is a side elevation of the same. Fig. 7 is a top end view of the complete governor. Fig. 8 is a horizontal section, taken on line 8—8 of Fig. 1. Figs. 9, 10, 11 and 12 are detail views, showing respectively the packing ring, the cylindrical body that supports the dial, the nut for controlling the adjustment of the valve lever, and the flange-member of the stuffing-box. And Fig. 13 is a central vertical section, taken on line 13—13 of Fig. 7; showing the gas dispensing valves closed.

In the drawings, 2 represents generally the hollow body of the governor proper, comprising an elongated horizontal portion $2'$, and an integral vertically disposed cylindrical portion $2^a$. Midway between its ends the portion $2^a$ is divided by spaced horizontal walls $2^b$—$2^c$, for providing a chamber 3 which receives the fuel gas through an opening $3'$. The walls $2^b$—$2^c$ are provided with registering openings $2^d$—$2^e$, which are fitted with bushings 4—$4'$, in which balanced-valves 5—$5'$ are loosely disposed, the lower ends of said bushings constituting the seats for the valves, as shown at $4^a$ in Figs. 1 and 13. The valves 5—$5'$ are connected by a link $5^a$, for operation as one part, and said valves are raised and lowered by a bell-crank 6, to which the uppermost valve connects by means of a rod $5^b$. When the valves as opened, as shown in Fig. 1, the gas contained in the chamber 3 passes upwardly and downwardly through the bushings 4—$4'$, and is finally discharged from the body through the open bottom of the cylinder $2^a$, from which the gas is carried to the burners (not shown). The portion of the gas admitted by the bushing 4 passes into the body portion $2'$ from which it flows via a passage $2^f$ into the outlet end of the cylinder $2^a$. The lever 6 is pivoted by pin $6'$ to the forked lower end of a plunger 7, which is disposed vertically in the body $2'$, the top end of said plunger projecting above the body and being reduced and threaded, as at $7'$. The plunger 7 is reciprocably supported by an elongated nut 8, which is disposed axially in a hollow cylindrical member 9, the latter being threaded into an opening $2^x$ of the body 2, and having an inner ledge $9'$ upon which the nut is supported and rotates, as shown in Fig. 13. A portion of the nut 8 is smaller than the bore of the member 9, and the space between said parts comprises a stuffing-box, in which a packing $9^a$ is compressed between a split ring 10 and a flange-bushing $10'$. This packing prevents the escape of the gas from body 2 through the member 9. Upon the flange of the bushing 10' is rotatably mounted a dial 12 on which clips, as 12' (see Fig. 7) bearing degree numbers are adjustably mounted, for indicating certain predetermined temperatures for a melting pot or the like (not shown). An arrow or other device as 12ª, shown on the top face of the body 2 in Fig. 7, may be employed for setting the dial. The member 12 is formed with an upwardly extending hub 12ᵇ, which surrounds the top end of the nut 8, the said hub being received in and supporting a fiber or rubber hand-knob or disk 13, by which the dial and the nut 8 may be rotated, for raising and lowering the plunger 7 and rocking the bell-crank 6, for varying the temperatures in a melting pot. The dial, and the disk 13, are rigidly secured to the nut 8, by a screw 13' (see Figs. 1 and 13).

Aside from the adjustment effected by the manipulation of the dial 12, the valves 5—5' are controlled entirely by a thermostatic element which comprises a tube 14, preferably made of brass or like expansible metal, which depends from a bell-shaped head or coupling 14', the said head being internally threaded for detachably mounting the thermostat upon the threaded lower end of a hollow leg 15, the open top end of said leg being detachably connected to the bottom of the body 2', by bolts 15', which pass through similar flanges 15ª—15ᵇ of the body and leg. Within the tube 14 is axially and loosely disposed a non-expansible or neutral rod 16, the lower end of said rod being threaded and adjustably disposed in an internally threaded flange-bushing 16', which is loosely and concentrically disposed in the lower end of the tube 14, the flange of the said bushing abutting the end of said tube. The upper end of rod 16 is threaded and screws into a forked head 17, which is pivoted by a screw 17', to a perforated lug 18' of an up-right lever 18, the said lever being pivoted to the lower inner wall of the leg 15 by a screw 18ª. The top end of lever 18 extends through a slotted opening 18ᵇ in the bottom of the body 2', and is pivoted by a pin 18ᶜ to one end of a link 19, whose opposite end is operatively connected to the vertical arm of the bell-crank 6. The thermostatic element 14 is preferably enclosed in a relatively thin steel tubular housing 20, for protecting the said elements from corrosion or other injury by contact with certain molten metals. The housing 20 is formed with an internally threaded bell-shaped top end 20' which may be screwed on to the lower threaded end of the head 14' (see Figs. 1, 2, 3).

The link 19 comprises two members 19'—19ª, whose remote ends are forked for respectively receiving the lever 18 and the vertical arm of the bell-crank 6, as shown in Figs. 1, 5, 8 and 13. The rear end of member 19' is bored out axially, to receive a reduced portion 19ᵇ of the member 19ª, the latter being held from displacement by a pin 19ᶜ, which passes through the end of the portion 19ᵇ. The member 19' is therefore movable towards and away from the member 19ª a distance equal to the play of the pin 19ᶜ in a slot 19ᵈ of the said member. The bodies of the members of the link are normally spaced apart, and in this space is disposed a coil cushion spring 21, which is compressed whenever the thermostat 14 expands beyond a predetermined degree indicated by the adjustment of the dial 12. The value of this cushion feature will be appreciated when it is understood that the valves 5—5' are closed by the expansion of the tube 14, which swings the lever 18 forwardly for tilting the bell-crank, as from the dotted line to the full line position, shown in Fig. 13. The vertical adjustment of the plunger 7 by the dial 12 determines the extent of the opening and closing movements of the valves 5—5' and when the dial is set for a certain predetermined temperature, the thermostat 14 gradually expands until the closing of the valves is effected. In case the thermostat continues to expand after the valves are closed, as for example, while the burners are consuming the residue of gas that remains in the supply pipe below the governor, the lever 18 also continues its leftward movement and tends to exert additional strain upon the already closed valves. This extra strain is absorbed by the spring 21 without danger of injuring the valves or related parts, as 5ª, 5ᵇ, and 6. The forward end of the member 19' is indirectly connected to the bell-crank 6 by means of a pin 22, which plays in a slot 6ª of the bell-crank and also in a slot 19ᵉ of the member 19', the said pin being rigidly supported by a plate 22', which is secured to the front side of the member 19ª, by a screw 22ª. The plate 22' is adjustable longitudinally on the member 19ª, by means of a slot 22ᵇ through which the screw 22ª passes. When the parts of the governor are assembled, the plate 22' is adjusted so as to effect the proper tilting movement of the bell-crank, after which the further adjustment of the bell-crank is effected entirely by the dial 12, as explained.

When the thermostat 14 contracts by the cooling of the contents of the melting pot, the lever 18 and the link 19 are moved thereby towards the right. This shifts the pin 22 in the same direction in the slot 6ª of the bell-crank 6, which allows the latter to gravitate and open the valves 5—5', for relighting the burners and restoring the predetermined temperature of the melting pot.

The long arm of the bell crank 6 is provided with a slot 6ᵇ, in which is disposed a pin 23 for guiding the said crank during its vertical movements. The pin 23 is preferably supported by the top wall of the body 2′, as best seen in Figs. 1 and 13. The gravitative play of the bell-crank is limited by a stop 24, which is rigid to the long arm of the crank 6, and is arranged to engage the top of the wall 2ᵇ of the chamber 3, as shown in Fig. 1.

Having thus described my invention what I claim, is—

1. A gas governor comprising a hollow body adapted to be charged with gas, a balanced-valve for controlling the outflow of the gas from the body, a bell-crank for operating said valve, an extensible link for operating said bell-crank, said link being in two parts, a spring interposed between said parts normally tending to extend the parts, a lever rockable in a vertical plane for reciprocating said link, a hollow thermostat adapted to be submerged in a medium to be heated, and a rod for operating said lever, said rod being disposed axially in the thermostat adapted to be moved away from the body by the expansion of the thermostat, said rod adapted to be moved towards the body by the opening movement of the valve.

2. A gas governor including a hollow body adapted to be filled with gas under pressure, having a gas receiving chamber and a gas outlet, a valve for controlling the outflow of the gas from the body, a bell-crank adapted for closing said valve, a contractible link for operating said bell-crank comprising two members movable towards and away from each other, tension means interposed between said members for normally holding the members extended, a lever for oscillating said link, a rod adapted to rock said lever in a vertical plane, a hollow thermostat loosely enclosing said rod, the opposite ends of said thermostat being open, and a flange bushing loosely engaging the bottom end of the thermostat and adjustably engaging the corresponding end of said rod.

3. A fuel gas governor comprising a hollow body having a gas-receiving chamber therein and a gas outlet, a valve disposed in said chamber for controlling the flow of the gas from the chamber into the body, a bell-crank for operating said valve, a reciprocable support for said bell-crank, a dial adapted to raise and lower said support for varying the opening and closing movements of said valve, a hollow leg depending from the body, a lever disposed in said leg and rockable in a vertical plane, a link connecting said bell-crank and said lever, said link comprising two aligning members movable towards and away from each other, tension means for normally holding said members extended adapted to yield for contracting said link when the power of said lever is greater than the resistance of the tension means, a thermostat below said leg, and means enclosed by said thermostat adapted for rocking said lever when the thermostat expands for effecting the closing of said valve.

4. A fuel gas governor comprising a hollow body adapted to be charged with gas under pressure having a gas receiving chamber and a gas outlet, a valve in said chamber for dispensing the compressed gas, a bell-crank for closing said valve, said valve adapted to open by gravity when the force that closes the valve is relaxed, a lever pivoted below said body movable in a vertical plane towards and away from the valve, a rod for operating said lever, a hollow thermostat below said lever adapted to be submerged in a medium to be heated, said thermostat enclosing said rod adapted when expanded linearly to move said rod downwardly for effecting the closing of the valve, a link comprising two aligning members adapted to be moved towards and away from each other operatively connecting said lever with the bell-crank, a spring disposed between said members adapted to normally hold them extended, said spring adapted to yield when the force exerted by said lever exceeds the normal resistance of the spring for preventing straining of the valve and related parts in case the thermostat continues to expand after the valve is closed.

5. In a gas governor, a hollow body adapted to be charged with gas under high pressure having a gas receiving chamber and a gas outlet, a pair of valves operable as one part for controlling the flow of the gas from said chamber into said body, a bell-crank for supporting and operating said valves, a plunger supporting the bell-crank, a dial for raising and lowering said plunger, a link for rocking said bell-crank in the direction for closing said valves, said link comprising two telescoping members, cushion means interposed between shouldered-portions of said members for preventing straining of the valve operating parts after the valves are closed, a hollow leg depending from the body a lever in said leg, a thermostat depending from said leg, said thermostat comprising a tube adapted to be submerged in a medium to be heated, the opposite ends of said tube being opened, a rod for operating said lever disposed in said tube and anchored to the bottom thereof adapted to be moved away from the body by the expansion of the tube, and to be moved towards the body by the gravitation of said valves, and a rock lever in said leg, the top and bottom ends of said lever being pivoted respectively to said link and said rod.

6. In a fuel gas governor, a hollow casing adapted to be charged with gas under high pressure having inlet and outlet openings and a gas chamber between said openings, a pair of valves operable as one part for dispensing gas in different directions from said chamber a bell-crank for controlling said valves, a plunger disposed vertically in the casing having a slot in which the bell-crank is pivotally mounted, the short arm of said crank being slotted, means for raising and lowering said plunger, a link for operating said bell-crank, said link comprising two parts adapted to be moved towards and away from each other for shortening and lengthening said link, a cushion spring disposed between said parts exerting its tension for extending said parts, an adjustable member carried by one part of said link having a pin adapted to engage the slot in said bell-crank and when moved in one direction to rock said bell-crank for closing said valve, said valves adapted to open by gravity when said link is moved in the opposite direction, a rocking lever pivotally connected to the other part of said link, a rod for rocking said lever, and a thermostat for actuating said rod, said thermostat comprising a tube that loosely encloses said rod adapted to be submerged in a medium to be heated.

7. The combination with a hollow body adapted to be charged with gas under high pressure, a valve for dispensing the gas for melting metal and the like, and a train of rockable members for operating said valve, of a hollow leg depending from the body and enclosing one of said rockable members, a thermostat depending from said leg, said thermostat comprising a tube adapted to be submerged in the molten metal, the opposite ends of said tube being open, a neutral rod disposed loosely and axially in said tube, a threaded flange-bushing adjustably mounted on the lower end of said rod and loosely telescoping the corresponding end of said tube, the flange of said bushing engaging the end of said tube adapted when the tube lengthens by the rise of the temperature of the metal to effect the downward movement of said rod for closing said valve, and a housing comprising a thin metal tube having its lower end closed and having its upper end secured to the head of the thermostat adapted to prevent the molten metal from coming in contact with the thermostat.

8. The combination with a hollow body adapted to be charged with gas at high pressure, a valve for dispensing the gas for heating a medium, of a bell-crank for supporting and operating said valve, a link for rocking said bell-crank said link comprising two aligning telescopically connected members, a thermostat adapted to be submerged in the medium to be heated, said thermostat being operatively connected to said link adapted when expanded to move said link in the direction for closing said valve, a spring for resiliently holding the members of said link extended, the tension of said spring being equal to the force required to positively close said valve, said spring adapted to be compressed by one of said members for preventing the straining or injuring of the valve and related parts in case the thermostat continues to expand after the valve is closed, and means adjustably mounted on the other member of said link for varying the operative movement of the bell-crank.

In testimony whereof I affix my signature.

HOWARD W. PARTLOW.